United States Patent [19]

Bisaillon

[11] 3,982,614

[45] Sept. 28, 1976

[54] CLUTCH RELEASE BEARING MONITORING DEVICE

[76] Inventor: Jean-Pierre Bisaillon, 280 Guillerm, Longueuil, Quebec, Canada

[22] Filed: Dec. 11, 1974

[21] Appl. No.: 531,711

[52] U.S. Cl. .................. 192/30 W; 116/114 W; 188/1 A
[51] Int. Cl.² ................................. F16D 66/00
[58] Field of Search ............. 192/30 W; 116/114 Q; 188/1 A; 340/52 A

[56] References Cited
UNITED STATES PATENTS

| | | |
|---|---|---|
| 2,323,489 | 7/1943 | Schmidt et al. .................. 192/30 W |
| 3,469,666 | 9/1969 | Goode .............................. 192/30 W |
| 3,702,458 | 11/1972 | Capachietti, Sr. et al. ... 192/30 W X |

*Primary Examiner*—Allan D. Herrmann
*Attorney, Agent, or Firm*—Bacon & Thomas

[57] ABSTRACT

A device for automatically monitoring the clearance between a release bearing and release levers of a conventional clutch to thereby also monitor wear of the clutch and/or to monitor the clutch adjustment. The clutch has a clutch lever, and a clutch pedal is connected to the clutch lever by a linkage system. The monitoring device includes one member fixed to a clutch linkage system and another member operably connected to the clutch lever. The two members move relative to one another. The device includes an electric switch which is closed when the clutch lever has moved a pre-determined distance due to wear in the clutch and thus has moved the first and second members relative to one another. The switch, when closed, energizes a suitable signal lamp to signal wear of the clutch.

4 Claims, 5 Drawing Figures

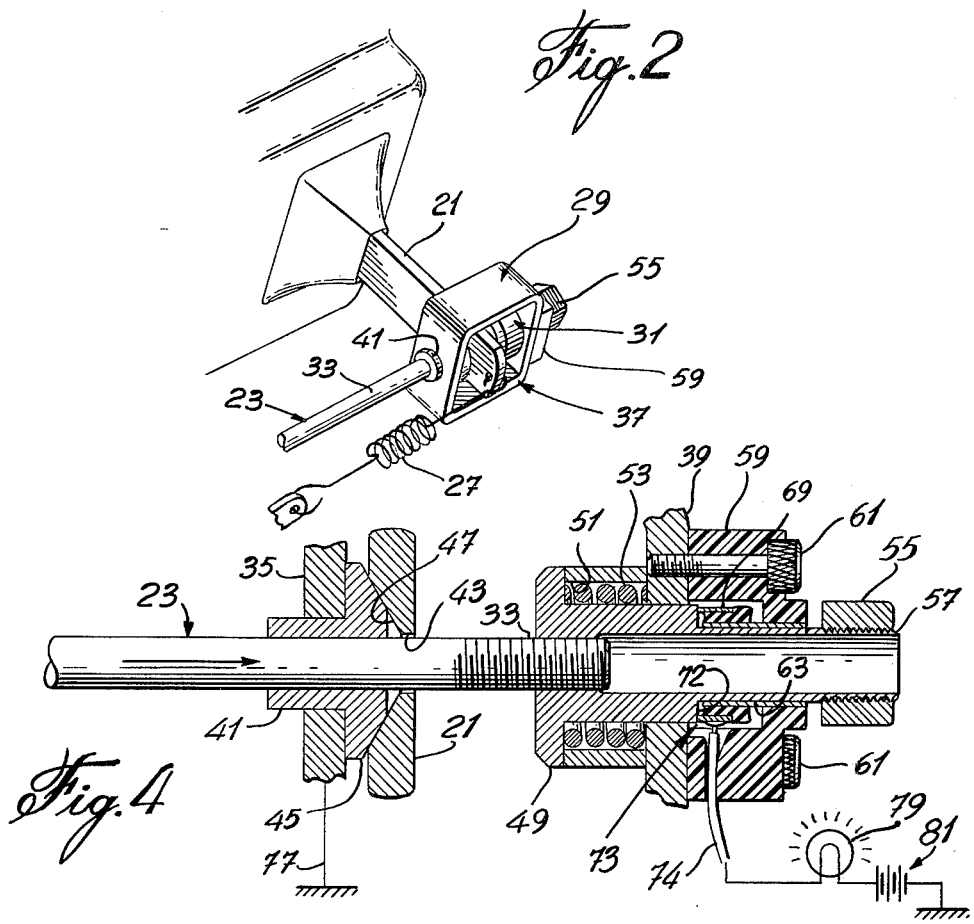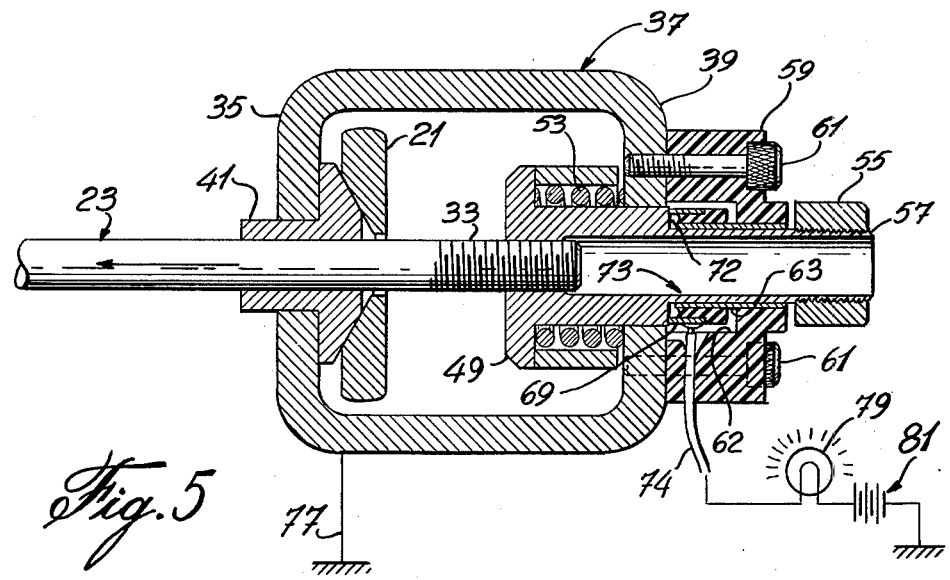

CLUTCH RELEASE BEARING MONITORING DEVICE

BACKGROUND OF THE INVENTION

1. Field of the Invention

This invention relates to a device for monitoring wear in a clutch.

The invention more particularly relates to a device for automatically monitoring the clearance between a release bearing and release levers of a conventional clutch.

In conventional clutch mechanisms, a pre-determined clearance is provided between the clutch release bearing and the clutch release levers which are engaged by the release bearing when the clutch is operated. Such clearance is provided to prevent rotation of the release bearing with the pressure plate and thus wear of the release bearing when the clutch is engaged.

The loss of such clearance is normally due to wear of the clutch friction disc which permits the release levers operating the pressure plate to swing so that their ends contact the release bearing.

2. Description of the Prior Art

Various devices have been provided in the prior art for monitoring wear in the clutch so as to know when clutch repair is required and more particularly so as to insure that the above clearance is maintained by proper adjustment of the clutch, or replacement of the clutch friction disc when it is worn out. Examples of such devices are shown in U.S. Pat. No. 2,323,489, issued July 6, 1943, C. J. Schmidt, et al., inventor, and in U.S. Pat. No. 3,469,666, issued Sept. 30, 1969, W. R. Goode inventor. These known devices have disadvantages however. The known devices require that the clutch be repaired immediately upon detection of the loss of the above mentioned clearance.

In addition, the known devices can be difficult to install on existing clutches, as witness for example the Schmidt, et al. device, and are relatively expensive in the type and number of parts required.

SUMMARY OF THE INVENTION

It is the object of the present invention to provide a clutch monitoring device which is used in the linkage assembly interconnecting the clutch pedal and the clutch release bearing but yet permits the driver to use his vehicle for a certain period of time before making the necessary repairs.

It is another object of the present invention to provide a clutch monitoring device which can be easily and quickly installed on existing clutch systems and which is relatively simple and inexpensive in construction.

The monitoring device of the present invention is intended for use in a clutch system with the system having a clutch, a clutch lever and a clutch pedal connected to the clutch lever by a linkage system. The monitoring device comprises a first member fixed to the linkage system and a second member operably connected to the clutch lever. The first and second members are movable relative to one another. Switch means are provided which are adapted to be closed when the clutch lever has moved a pre-determined distance due to wear in the clutch and thus has moved the first and second members relative to one another. Signalling means are provided which are operated by the switch means when the switch means is closed.

DESCRIPTION OF THE DRAWINGS

The invention will now be disclosed by way of example with reference to a preferred embodiment and to the accompanying drawings in which:

FIG. 2 is a perspective view showing the device connected to the clutch lever;

FIG. 4 is a cross-sectional view of the device when the clutch is normal and disengaged; and FIG. 5 is a cross-sectional view of the device when the clutch is worn and engaged.

DESCRIPTION OF THE PREFERRED EMBODIMENTS

Figure 1:
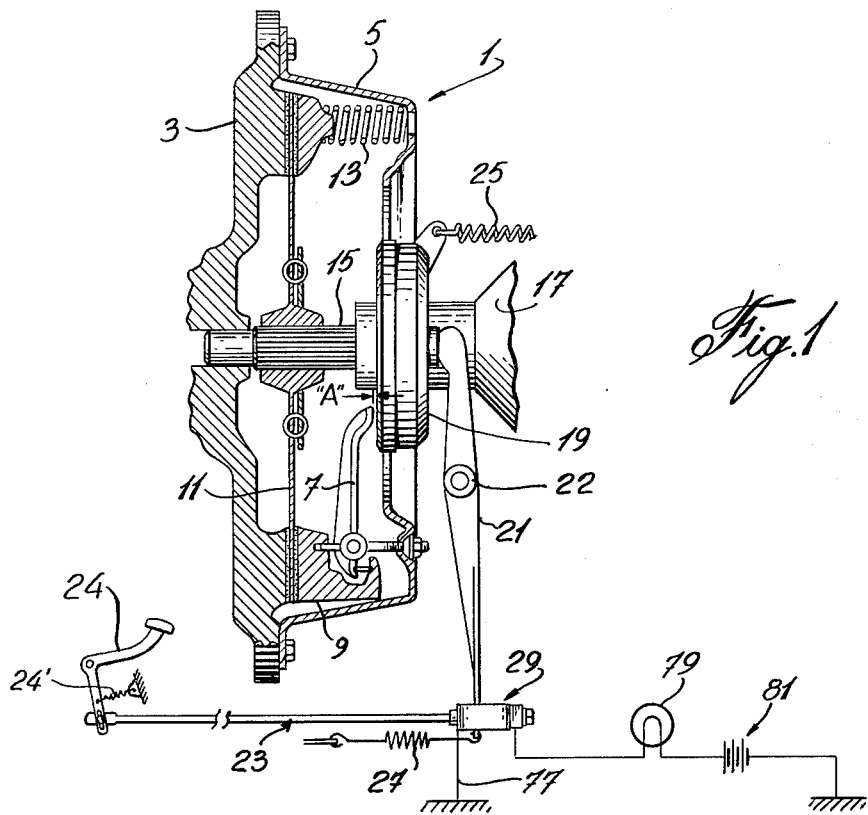
FIG. 1 is a cross-sectional view of a clutch employing the device of the present invention.

Referring to FIG. 1 there is shown a conventional clutch mechanism 1 including a flywheel 3 upon which is secured a cover plate 5 supporting clutch levers 7 (only one shown). Levers 7 are engaged at one end by a pressure plate 9 which is pressed against a friction disc 11 by means of springs 13 (only one shown) placed between the pressure plate 9 and the cover plate 5. As commonly known, the friction disc 11 is coupled to shaft 15 of the vehicle transmission 17. The other end of clutch levers 7 is engaged by release bearing 19 which is operated by a lever 21, pivoted at pivot 22 and connected to a linkage assembly 23 normally operated by a clutch pedal 24 against the action of springs 25 and 27.

In normal operation when lever 21 is rotated counter-clockwise by the linkage assembly 23 against the action of springs 25, 27, the clutch release bearing 19 pushes on levers 7 to disengage pressure plate 9 from friction disc 11 to release the clutch.

In order to prevent rotation of the clutch release bearing 19 when the clutch is engaged, a suitable clearance is provided between the clutch release bearing 19 and levers 7 which are driven with the cover plate 5. However, when the clutch levers are out of adjustment or when the clutch friction disc is worn, the levers 7 bear continuously against the disc and cause wear of the release bearing and slippage of the friction disc. In order to prevent such wear or damage to the release bearing and to the friction disc, a monitoring device 29, in accordance with the invention, is provided where the linkage assembly interconnects with the lever 21.

The monitoring device 29 includes a first member 31, of tubular shape, threadably attached to the end of a rod 33 of the linkage assembly 23. The rod 33 passes through one wall 35 of a second member 37 of the monitoring device 29, which second member has a substantially rectangular ring shape. The tubular first member 31 projects out from the wall 39 opposite the one wall 35. The rod 33 is slidably mounted through wall 35 by a spacer member 41. Lying adjacent spacer member 41 is the lower end of lever 21 which passes through the second member. Lever 21 is biased against spacer member 41, and thus second member 37, by spring 27. Rod 33 passes freely through a hole 43 in lever 21. If desired, the surface 45 of spacer member 41 adjacent lever 21 can be bevelled, and a conical depression 47 for receiving surface 45 of spacer member 41, can be formed in lever 21. This arrangement provides for more positive contact between the lever and the spacer.

First tubular member 31 has an enlarged head 49 within the confines of second member 37. A circular channel 51 is formed in the head 49 opening toward wall 39. A spring 53 is mounted in the channel 51 and tends to bias head 49 away from wall 39. Separation of the members 31, 37, due to the action of spring 53 is prevented by threading a nut 55 onto the threaded end 57 of member 31 which projects through, and past, an insulating block 59, attached by bolts 61 to the other surface of wall 39. Nut 55 prevents member 37 from being pushed off the end of member 31 by spring 53.

Block 59 has a counterbore 62 open toward wall 39. A sleeve 63 is attached to a bore 65 in block 59 and sleeve 63 projects into counterbore 62. First member 31 slides through sleeve 63. Mounted concentrically about sleeve 63 in counterbore 62, but spaced therefrom by a resilient ring 67 of insulating material is an electrically conducting ring 69. The ring 69 is mounted on resilient ring 67 so as to have an edge 71 projecting toward wall 39. The edge 71 faces, but is spaced from, a shoulder 72 on tubular member 31. Ring 69 forms one electrical contact and shoulder 72 forms another electrical contact of a switch 73. A conductor 74 is attached to ring 69 and passes out from counterbore 62 via a hole 75 in block 59.

Second member 37 is grounded by a suitable lead 77. Conductor 74 connects to a signalling means, such as a light 79, and to a power source, such as battery 81. The light 79 can be mounted on the dashboard of a vehicle.

Figure 3:
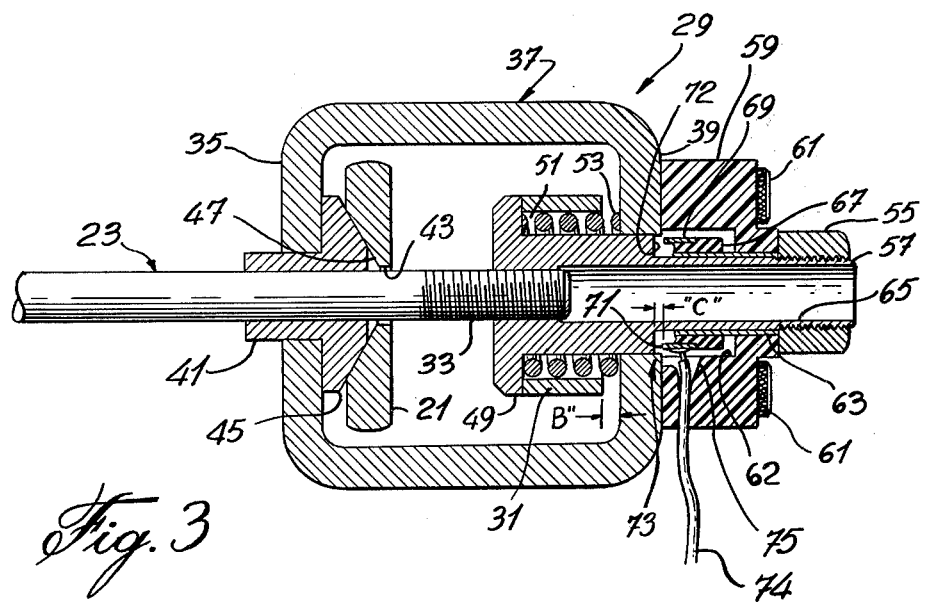
FIG. 3, appearing on the same sheet as FIG. 1, is a cross-sectional view of the device when the clutch is normal and engaged.

In operation of the monitoring device 29, when the clutch 1 is engaged, and there is no undue wear of the clutch disc, there exists sufficient clearance "A" between levers 7 and bearing 19. Bearing 19 is thus in a normal position, dictated by springs 25, 27, and so is lever 21. In this normal position, lever 21 has a tendency to move to the left but is prevented from doing so by spring 53 biasing member 37 to the right and also lever 21 via spacer 41. Spring 53 works against fixed rod 33, and being slightly stronger than springs 25, 27, maintains head 49 of first member 31 a pre-determined distance "B" from wall 39. At the same time, edge 71 is spaced from axial contact with shoulder 72 on first member 31 at distance "C". Distance "C" is less than distance "B" as shown in FIG. 3. In this position, with no contact between ring 69 and shoulder 72, switch 73 is open and light 79 is off.

When the clutch pedal 24 is operated to disengage the clutch, rod 33 pushes first member 31 to the right as viewed in FIG. 4. Because of the strength of the spring 53, member 37, and lever 21 also move to the right, causing bearing 19 to move through distance A to the left against levers 7. When levers 7 are contacted by bearing 19, member 31 now compresses spring 53 and moves to abut against member 37. Member 37 no longer moves to the right during this stage since springs 13 are stronger than spring 53. As member 31 moves to the right, sleeve 69 contacts shoulder 72 closing switch 73 and causing light 79 to turn on. This in effect, tests the operability of light 79. Once member 31 abuts member 37, continued pedal pressure overcomes springs 13 disengaging the clutch.

When the clutch wears, levers 7 gradually move through distance "A" to contact bearing 19. Continued wear causes bearing 19 to move thus moving lever 21 about pivot 22. As the lower end of lever 21 moves to the left, as shown in FIG. 5, it moves member 37 to the left against spring 53. Rod 33 at this time is fixed by the pedal spring 24' which spring is stronger than spring 53. As member 37 moves to the left it moves sleeve 69 to the left through distance C until edge 71 abuts shoulder 72. This closes switch 73 and causes light 79 to turn on, warning the operator that the clutch is worn and that it should be repaired shortly. The distance C is chosen so that the clutch is not completely worn when light 79 goes on and thus immediate repairs are not required. The light 79, coming on without disengaging the clutch, only serves to warn the operator that repairs will be needed shortly, since there is excessive wear in the clutch.

I claim:
1. A monitoring device for use in a clutch system, the system having a clutch including a clutch lever, and a clutch pedal having a clutch rod connected therewith, said monitoring device serving both to monitor clutch wear and to operably connect said clutch rod with said clutch lever, and comprising:
   a. a first member carried by said clutch rod, and including a projecting portion;
   b. a second member including an end wall and side wall means, said first member being received within said second member and being movable relative thereto, said end wall having an opening therethrough sized to receive said projecting portion of said first member, and the end of said side wall means of said second member located opposite said end wall having means thereon for operably engaging said clutch lever;
   c. resilient means effective to bias said first member away from said end wall and toward the end of said second member disposed opposite said end wall, said first member being urged toward said end wall against the force of said resilient means when said clutch pedal is depressed to operate said clutch rod, and when said clutch lever pulls on said second member against said clutch rod;
   d. wear signaling means; and
   e. actuating means connected with said wear signaling means, said actuating means being mounted on the outer side of said end wall of said second member, and being operable by said projecting portion of said first member extending through said opening in said end wall when said first member has been moved beyond a predetermined distance toward said end wall against the force of said resilient means.

2. A monitoring device as recited in claim 1, wherein said wear signaling means includes a signal device and a power supply, and wherein said actuating means includes an electrical switch connected with said signal device and said power supply.

3. A monitoring device as recited in claim 2, wherein said electrical switch includes a metallic sleeve mounted on the outer side of said end wall and insulated therefrom, said metallic sleeve being positioned to confront and to be engageable by said projecting portion of said first member, and both of said metallic sleeve and said projecting portion of said first member being connected in an electrical circuit with said signal device and said power supply.

4. A monitoring device as recited in claim 3, wherein said metallic sleeve is carried by an insulating block that is secured to the outer side of said end wall.

* * * * *